US009515922B2

(12) United States Patent
Desanti et al.

(10) Patent No.: US 9,515,922 B2
(45) Date of Patent: *Dec. 6, 2016

(54) DISTRIBUTED FIBRE CHANNEL FORWARDER

(71) Applicant: Cisco Technology, Inc., San Jose, CA (US)

(72) Inventors: Claudio Desanti, Oakland, CA (US); Silvano Gai, Groveland, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/559,415

(22) Filed: Dec. 3, 2014

(65) Prior Publication Data

US 2015/0085867 A1    Mar. 26, 2015

Related U.S. Application Data

(63) Continuation of application No. 13/308,627, filed on Dec. 1, 2011, now Pat. No. 8,948,176.

(51) Int. Cl.
*H04L 12/721* (2013.01)
*H04L 12/741* (2013.01)
*H04L 12/931* (2013.01)

(52) U.S. Cl.
CPC ............ *H04L 45/44* (2013.01); *H04L 45/74* (2013.01); *H04L 49/357* (2013.01)

(58) Field of Classification Search
CPC .......... H04L 45/00; H04L 49/00; H04L 45/44; H04L 45/74; H04L 49/357
See application file for complete search history.

(56) References Cited

U.S. PATENT DOCUMENTS

| 8,948,176 | B1 * | 2/2015 | Desanti et al. | 370/392 |
| 2007/0171815 | A1 * | 7/2007 | Takeuchi | G06F 3/0617 370/218 |
| 2009/0177837 | A1 * | 7/2009 | Kaneda | G06F 1/3203 711/112 |
| 2011/0135303 | A1 | 6/2011 | Hufferd | |
| 2012/0106957 | A1 * | 5/2012 | Willeke | H04L 29/12207 398/58 |
| 2012/0177044 | A1 * | 7/2012 | Berman | H04L 12/4625 370/392 |
| 2012/0177045 | A1 * | 7/2012 | Berman | H04L 12/4633 370/392 |
| 2012/0177370 | A1 * | 7/2012 | Berman | H04L 49/357 398/58 |
| 2012/0254554 | A1 * | 10/2012 | Nakajima | G06F 3/0607 711/154 |

* cited by examiner

*Primary Examiner* — Andrew Lai
*Assistant Examiner* — Sumitra Ganguly
(74) *Attorney, Agent, or Firm* — Edell, Shapiro & Finnan, LLC

(57) ABSTRACT

A distributed Fiber Channel over Ethernet (FCoE) Forwarder (FCF) and a distributed Fiber Channel Switch are described. The Distributed FCF is realized by instantiating respective connections between at least one Controlling FCF and a plurality of FCoE Data-Plane Forwarder (FDF) devices and between individual FDF devices. The Distributed FC Switch is realized by instantiating respective connections between at least one Controlling Switch and a plurality of FC Data-Plane Forwarder (FCDF) devices and between individual FCDF devices.

15 Claims, 18 Drawing Sheets

FIG. 6

| WORD | BIT 31 30 29 28 27 26 25 24 23 22 21 20 19 18 17 16 | 15 14 13 12 11 10 9 8 | 7 6 5 4 3 2 1 0 |
|---|---|---|---|
| 0 | FIP PROTOCOL CODE | RESERVED | FIP SUBCODE |
| 1 | FIP DESCRIPTOR LIST LENGTH | RESERVED FP SP | C D R A S F P |
| 2 | FIP DESCRIPTOR LIST (m WORDS) | | |
| n-1 | FIP_PAD (n-m-2 WORDS) | | |

DISTRIBUTED FIBRE CHANNEL FORWARDER

This application is a continuation of U.S. application Ser. No. 13/308,627, filed Dec. 1, 2011, the entirety of which is incorporated herein by reference.

TECHNICAL FIELD

The present disclosure relates to controlling and managing traffic in an electronic communications system.

BACKGROUND

Fibre Channel (FC) is a protocol for connecting storage devices in a fabric network. The FC standard identifies a protocol and a collection of physical interfaces for managing computer peripheral components. A purpose of this protocol is to efficiently manage large numbers of storage devices using serial interfaces operating over optical or electrical interfaces. FC provides an efficient and dependable means for transferring data between workstations, mainframes, supercomputers, desktop computers, storage devices, displays and other peripherals.

Recent developments have extended Fibre Channel to Ethernet. Fibre Channel over Ethernet (FCoE) is a protocol that leverages Ethernet extensions that enable the establishment of lossless connections between two Ethernet nodes. The FCoE protocol uses such lossless connections. More specifically, native FC frames are encapsulated in Ethernet frames such that Ethernet becomes the physical interface and FC becomes the transport protocol. At an Ethernet receiving node, the native FC frames are de-encapsulated from the Ethernet frames and then processed in accordance with the FC protocol. By deploying the lossless capability in Ethernet, FC can be extended to Ethernet-capable network devices, thereby increasing the reach of FC connected devices. One of the components that enables FCoE is known as an FCoE Forwarder (FCF). An FCF is a component that forwards FCoE frames in accordance with the FC rules. An FCF is functionally equivalent to a native Fibre Channel switch. An FCF may support both Ethernet interfaces and native Fibre Channel interfaces.

BRIEF DESCRIPTION OF THE DRAWINGS

FIG. 6 shows a FCoE Initialization Protocol (FIP) frame including designated flags for indicating whether the originator of the FIP frame is a Controlling FCF or a FDF device.

DESCRIPTION OF EXAMPLE EMBODIMENTS

Overview

A system and method are described for providing a Distributed FCF (FCoE Forwarder) and a Distributed FC Switch. The Distributed FCF is realized by instantiating respective connections between at least one Controlling FCF and a plurality of FCoE Data-Plane Forwarder (FDF) devices and between individual FDF devices. The Distributed FC Switch is realized by instantiating respective connections between at least one Controlling Switch and a plurality of FC Data-Plane Forwarder (FCDF) devices and between individual FCDF devices. The components of the distributed FCF are collectively represented by a single Domain identifier (ID), and thus the distributed FCF appears to entities as a non-distributed FCF. In the case of a Distributed FCF, when a FCoE frame is received at the distributed FCF it is forwarded, based on a destination Media Access Controller (MAC) address in the FCoE frame or a Destination_ID of the enacapsulated FC frame, to one of a connected Fiber Channel fabric, to a connected host (e.g., a storage device) that is accessible by the Controlling FCF, or to one of the FDF devices to which other hosts might be connected. That is, the FCoE frame is forwarded over a virtual link based on a destination address identifier (D_ID) of the FC frame encapsulated in the FCoE frame. In the case of a Distributed FC Switch, when a FC frame is received it is forwarded over a link based on a destination address identifier (D_ID) of the FC frame.

Example Embodiments

The functionality of a non-distributed FCF is defined by the INCITS FC-BB-5 standard and the functionality of a non-distributed FC Switch is defined by the INCITS FC-SW-5 standard. The Distributed FCF is realized by instantiating respective connections between at least one Controlling FCF and a plurality of FCoE Data-Plane Forwarder (FDF) devices and between individual FDF devices. The Distributed FC Switch is realized by instantiating respective connections between at least one Controlling Switch and a plurality of FC Data-Plane Forwarder (FCDF) devices and between individual FCDF devices.

A purpose of a Distributed FCF and of a Distributed FC Switch is to enable a lower cost switching infrastructure for FCoE and for native Fibre Channel. As will be explained in more detail below, this is possible because FDFs and FCDFs are respectively simpler devices compared to FCFs and FC Switches. Moreover, FDFs and FCDFs share a common Domain_ID (referred to herein as a Virtual Domain_ID). As a result, the number of Domain_IDs used in a Fabric deploying distributed components is lower than in a traditional Fabric. From a host perspective a Distributed FCF or a Distributed FC Switch behaves as a traditional FDF or FC Switch.

Distributed FCF Topologies

Figure 1:
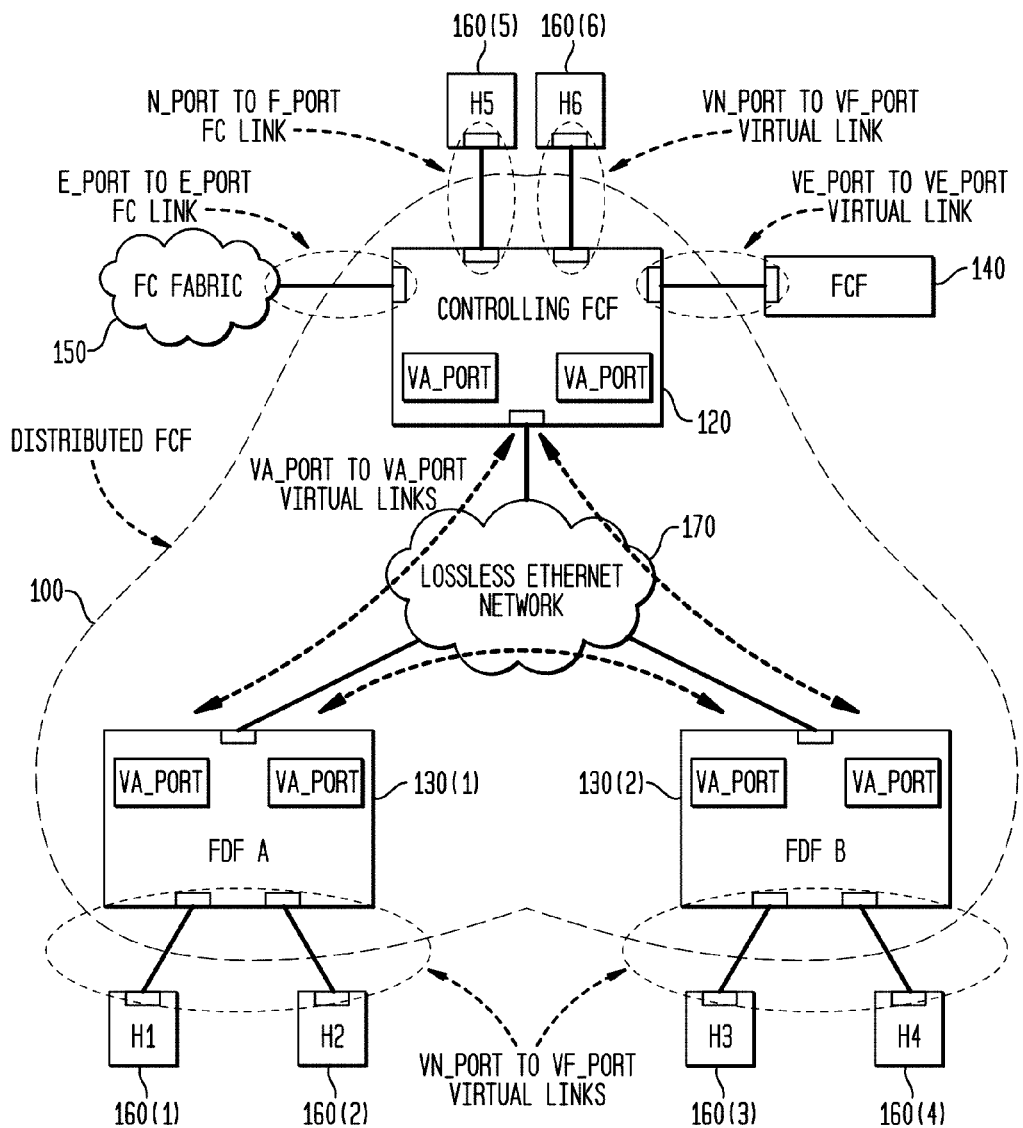
FIG. 1 depicts a Distributed FCoE Forwarder (FCF) including a Controlling FCF and a set of FCoE Data-Plane Forwarder (FDF) devices.

Referring to FIG. 1, a Distributed FCF (FCoE Forwarder) 100 comprises a set of FDFs (FCoE Data-Plane Forwarders) 130(1), 130(2) associated with at least one Controlling FCF 120, which controls the operations of the set of FDFs 130. From an external point of view (i.e., outside the dashed line designated by reference numeral 100) a Distributed FCF 100 behaves as an FCF. In particular, a Distributed FCF supports the instantiation of Virtual Node Port to Virtual Fabric Port Virtual Links (i.e., VN_Port to VF_Port Virtual Links) with FCoE Nodes (ENodes) and of Virtual Expansion Port to Virtual Expansion Port Virtual Links (i.e., VE_Port to VE_Port Virtual Links) with FCFs. VN_Port to VF_Port Virtual Links are supported by both FDFs and Controlling FCFs, while VE_Port to VE_Port Virtual Links are supported by Controlling FCFs. This means that it is possible to connect a Distributed FCF to another FCF (e.g., 140) or to a native FC fabric 150 through a Controlling FCF 120, but not through an FDF 130. In fact, as will be explained in more detail later herein, an FDF 130 is a simplified FCoE switching entity that is configured primarily to pass data from a given connected Host (via VN_Port to VF_Port Virtual Links), e.g., 160(1)-160(4), to the Controlling FCF 120 or to another FDF via a lossless Ethernet network 170.

As shown, FDFs 130 instantiate Virtual Adjacent Port to Virtual Adjacent Port Virtual Links (i.e., VA_Port to VA_Port Virtual Links) between themselves, as well as between respective ones of themselves and Controlling FCF 120. A VA_Port, in this context, is a Virtual A_Port, which refers to an instance of the FC-2V sublevel of Fibre Channel that communicates with another VA_Port and that is dynamically instantiated on successful completion of an FCoE Instantiation Protocol (FIP) ELP (Exchange Link Parameters) Exchange.

From an internal point of view (i.e., inside the dashed line designated by reference numeral 100), VA_Port to VA_Port Virtual Links enable FCoE frames forwarding between Controlling FCF 120 and FDFs 130, as well as between FDFs 130. In addition, VA_Port to VA_Port Virtual Links are used to exchange control information between Controlling FCF 120 and FDFs 130 through the VA_Port protocols.

Figure 2:
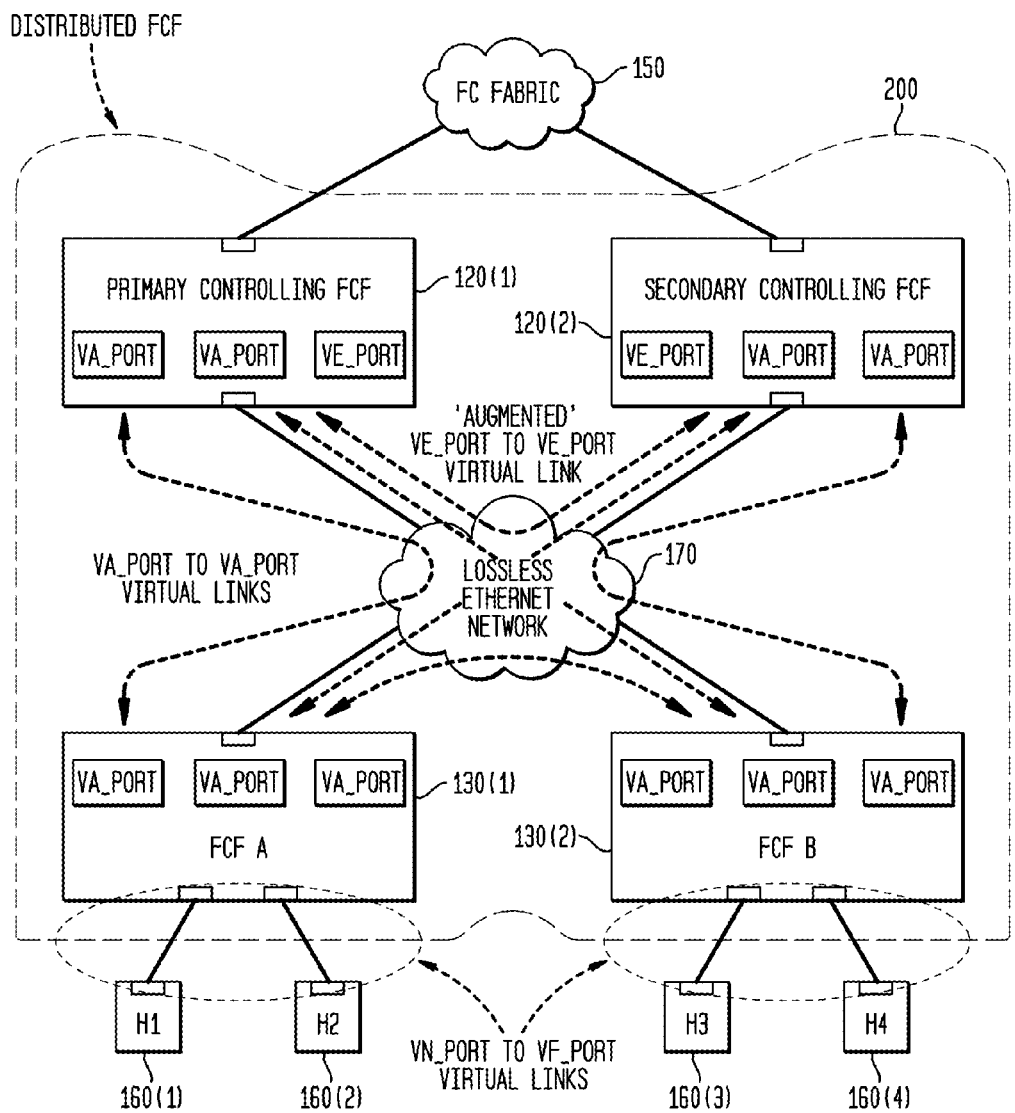
FIG. 2 depicts an embodiment of a Distributed FCF including a redundant pair of Controlling FCFs.

In accordance with a particular implementation, FDFs 130 are not able to operate without a Controlling FCF 120. As such, a Distributed FCF 100 with only one Controlling FCF 120, as the one shown in FIG. 1, ceases its operations when the Controlling FCF 120 becomes unavailable. To avoid this issue, as shown in FIG. 2, a Distributed FCF 200 may support a redundant configuration of two Controlling FCFs, a primary one 120(1) and a secondary one 120(2). The primary Controlling FCF 120(1) may perform all Controlling FCF functions, while the secondary Controlling FCF 120(2) keeps its state synchronized with the primary one and is able to take the place of the primary one in case of its failure.

Still referring to FIG. 2, the two Controlling FCFs 120(1) and 120(2) in a redundant Distributed FCF 200 instantiate at least one 'augmented' VE_Port to VE_Port Virtual Link between themselves, where the term 'augmented' indicates that Virtual Link is used also for a redundancy protocol, in addition to normal VE_Port operation. More than one 'augmented' VE_Port to VE_Port Virtual Link can be implemented to improve the redundancy of the system. These 'augmented' VE_Port to VE_Port Virtual Links are used by the primary controlling FCF 120(1) to inform the secondary Controlling FCF 120(2) of the Virtual Domain_ID from which to perform N_Port_ID allocations for ENodes connected to the set of FDFs 130 belonging to the Distributed FCF 200. Using a Virtual Domain_ID to assign N_Port_IDs enables seamless operation in case of failures of one of the two redundant Controlling FCFs 120(1), 120(2). As a result, a redundant Distributed FCF typically uses three Domain_IDs: one for each Controlling FCF 120(1), 120(2) and one for the Virtual Domain_ID.

The two redundant Controlling FCFs 120(1), 120(2) instantiate VA_Port to VA_Port Virtual Links to enable FCoE frames forwarding and the communication of control information between them and the FDFs 130. In a redundant configuration like that shown in FIG. 2, FDFs 130 instantiate VA_Port to VA_Port Virtual Links to each of the Controlling FCFs 120(1), 120(2) and between themselves, assuming they are directly reachable through the Ethernet topology 170.

Figure 3:
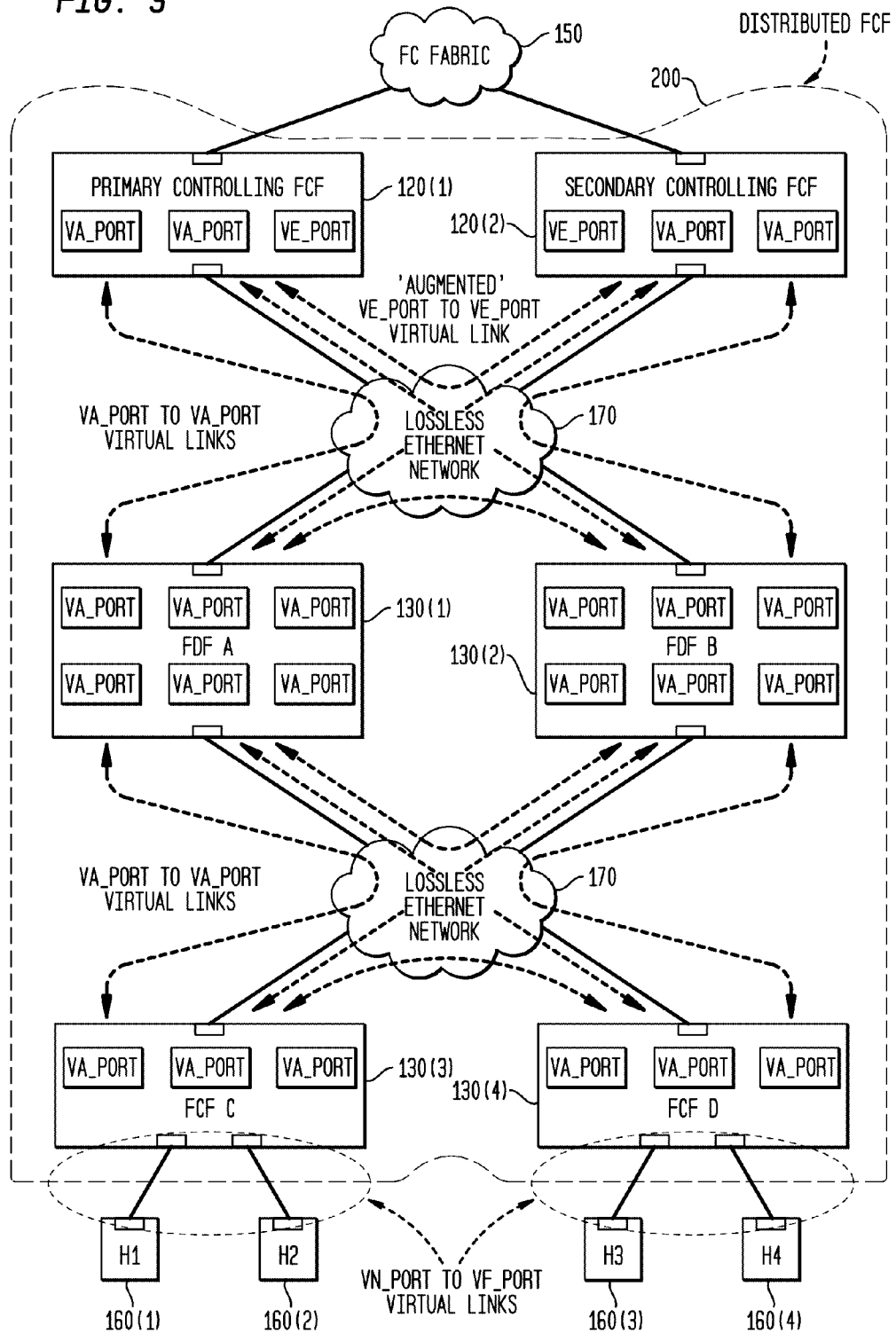
FIG. 3 depicts an example of a Distributed FCF with cascaded FDF devices.

Referring now to FIG. 3, a Distributed FCF 200 may have a cascaded FDF configuration when FDFs 130(1)-130(4) with at least two VA_Port capable FDF-MACs and independent Lossless Ethernet Bridging Elements are used.

The topologies described above and depicted in FIGS. 1-3 enable a more extensible and flexible Fibre Channel over Ethernet implementation by deploying multiple FDFs 130, perhaps closer to connected Hosts 160, and permit the Hosts 160 to consider the connection to an FDF 130 as a connection to what would normally be a non-distributed FCF. In other words, and as mentioned above, the Distributed FCFs 100, 200 look like an FCF from the perspective of a Host and the Host need not have any knowledge of the distributed nature of FCF functionality.

Controlling FCF

Figure 4:
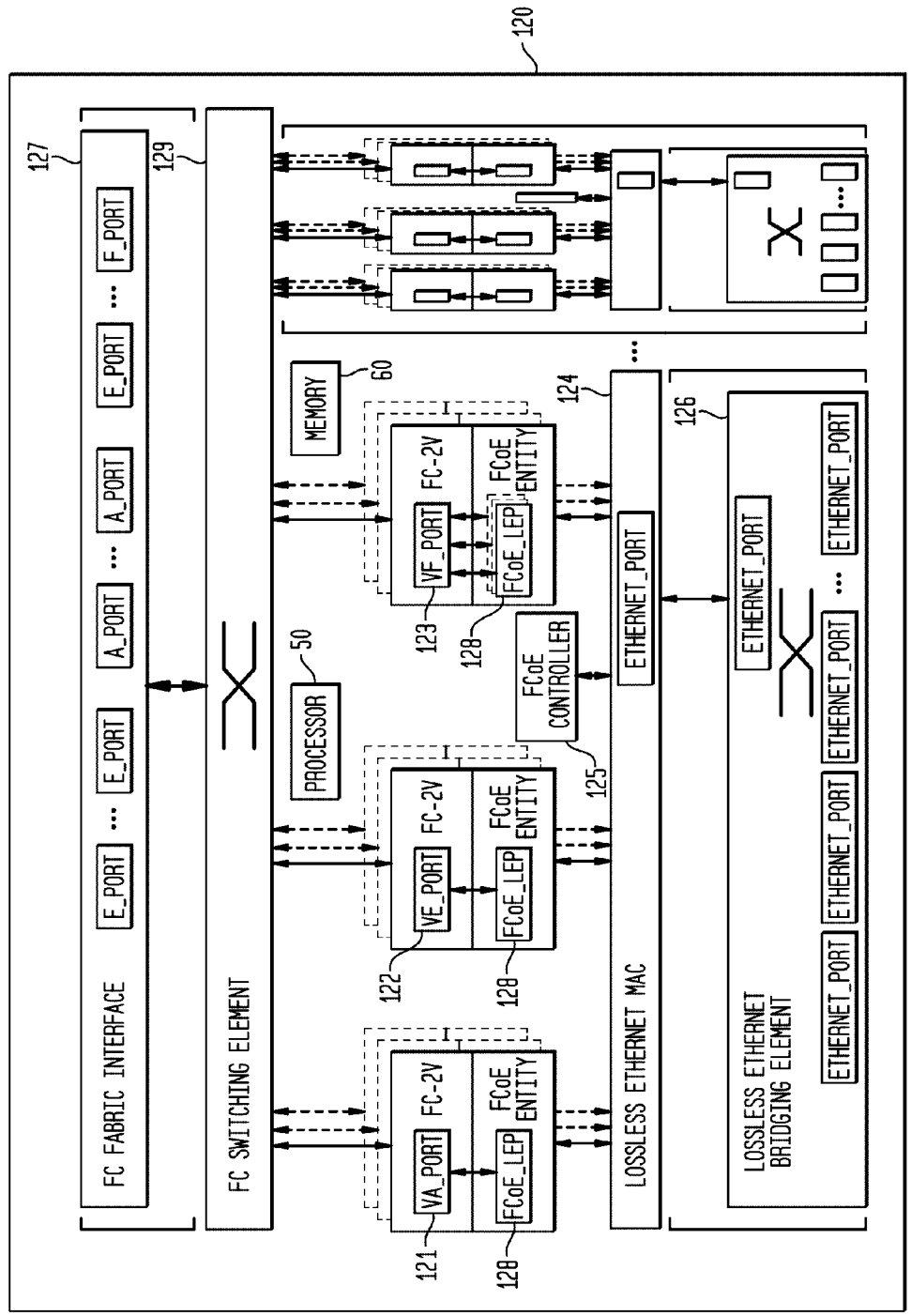
FIG. 4 is an example functional block diagram of a Controlling FCF.

FIG. 4 shows a functional block diagram of a Controlling FCF 120, where the bracketed functional components are optional. A Controlling FCF 120 is an FCF that supports the instantiation of VA_Ports 121 over its Lossless Ethernet MACs (FCF-MACs), in addition to VE_Ports 122 and VF_Ports 123. As for any FCF, each FCF-MAC of a Controlling FCF 120 may be coupled with a Lossless Ethernet bridging element 126. Controlling FCF 120 may also have a Fibre Channel Fabric interface 127, providing native E_Port, A_Port, and F_Port Fibre Channel connectivity (i.e., non-virtual, non-Ethernet-based connections directly into a Fibre Channel infrastructure). Virtual and non-Virtual ports communicate through the FC Switching Element 129. The FCoE Controller 125 is a functional entity that performs the FCoE Initialization Protocol (FIP) and instantiates or de-instantiates VA_Ports, VE_Ports, or VF_Ports, as needed.

The FCoE Controller 125 and the other components depicted in FIG. 4 may be implemented using a processor 50 and associated memory 60, which may include program logic or instructions for implementing the functionality of the Controlling FCF 120. Processor 50 may be a programmable processor (microprocessor or microcontroller) or a fixed-logic processor. In the case of a programmable processor, any associated memory (e.g., 60) may be of any type of tangible processor readable memory device (e.g., random access, read-only, etc.) that is encoded with or stores instructions that can implement the functionality of Controlling FCF 120. Alternatively, processor 50 may be comprised of a fixed-logic processing device, such as an application specific integrated circuit (ASIC) or digital signal processor that is configured with firmware comprised of instructions or logic that cause the processor to perform the functions described herein. Thus, the functionality of Controlling FCF 120 may be encoded in one or more tangible computer readable storage media for execution, such as with fixed logic or programmable logic (e.g., software/computer instructions executed by a processor) and any processor may be a programmable processor, programmable digital logic (e.g., field programmable gate array) or an ASIC that comprises fixed digital logic, or a combination thereof. In general, any process logic may be embodied in one or more processor- or computer-readable storage media that is encoded with instructions for execution by a processor that, when executed by the processor, are operable to cause the processor to perform the functions described herein. The foregoing description is also applicable to other switching elements (described later herein) having similarly-depicted processor 50 and memory 60.

For a VA_Port/VE_Port capable FCF-MAC, the FCoE Controller 125 may perform several functions including:

a) FIP virtual local area network (VLAN) discovery protocol to discover FCoE VLANs;

b) discovery of other VA_Port/VE_Port capable FCF-MACs, VE_Port capable FCF-MACs, and VA_Port capable FDF-MACs connected to the same Lossless Ethernet network using the FIP discovery protocol;

c) instantiating a VE_Port/FCoE_LEP (FCoE Link End-Point) pair on successful completion of each FIP Exchange Link Parameters (ELP) Exchange with a remote VA_Port/VE_Port capable FCF-MAC or a remote VE_Port capable FCF-MAC;

d) de-instantiating a VE_Port/FCoE_LEP pair on receiving a FIP Clear Virtual Link request;

e) instantiating a VA_Port/FCoE_LEP pair on successful completion of each FIP ELP Exchange with a remote VA_Port capable FDF-MAC;

f) de-instantiating a VA_Port/FCoE_LEP pair on receiving a FIP Clear Virtual Link request;

g) monitoring the status of the instantiated VE_Port/FCoE_LEP and VA_Port/FCoE_LEP pairs;

h) initiating FIP Clear Virtual Link requests as needed to terminate Virtual Links to other VE_Ports or VA_Ports;

i) transmitting periodic FIP Discovery Advertisements to the All-FCF-MACs address; and j) monitoring the status of remote VE_Ports and VA_Ports by maintaining timers and verifying that periodic FIP Discovery Advertisements are received within a predetermined time period.

The FCoE_LEP 128 is the functional entity performing the encapsulation of FC frames into FCoE frames in transmission and the decapsulation of FCoE frames into FC frames in reception. An FCoE_LEP 128 operates according to the MAC address of the local link end-point and the MAC address of the remote link end-point. When encapsulating FC frames into FCoE frames, the MAC address of the local link end-point is used as source address and the MAC address of the remote link end-point is used as destination address of the generated FCoE frame. When decapsulating FC frames from FCoE frames, the FCoE_LEP 128 verifies that the destination address of the received FCoE frame is equal to the MAC address of the local link end-point and verifies that the source address of the received FCoE frame is equal to the MAC address of the remote link end-point. If either check fails the FCoE frame may be discarded.

For a VA_Port/VE_Port capable FCF-MAC, the MAC address of the local link end-point is the FCF MAC address and the MAC address of the remote link end-point is the MAC address of the remote FCF-MAC or FDF-MAC with which a FIP ELP Exchange has been successfully completed.

A VA_Port is an instance of the FC-2V sublevel of Fibre Channel that is dynamically instantiated together with its FCoE_LEP 128 on successful completion of a FIP ELP Exchange. A VA_Port receives FC frames from the FC Switching Element 129 and sends them to its FCoE_LEP 128 for encapsulation and transmission over the Lossless Ethernet network 170. In a similar way, a VA_Port sends FC frames received from its FCoE_LEP 128 to the FC Switching element 129.

FDF

Figure 5:
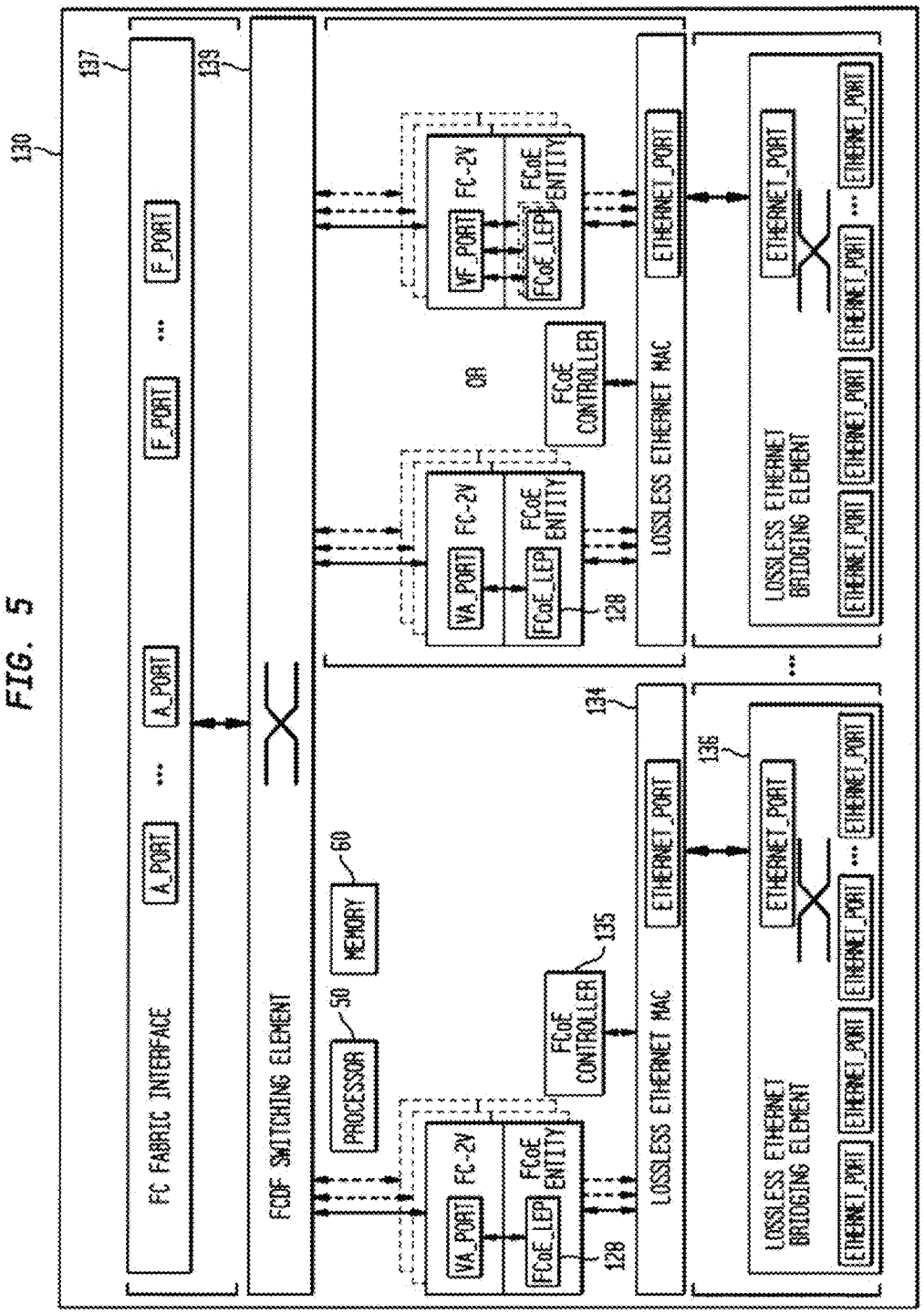
FIG. 5 is an example functional block diagram of an FDF device.

FIG. 5 shows a functional model of an FDF 130, where the bracketed functional components are optional. FDF 130 comprises a Fibre Channel Data-Plane Forwarder (FCDF) Switching Element 139 with at least one Lossless Ethernet MAC (FDF-MAC) 134. Each FDF-MAC 134 is coupled with an FCoE Controller 135. Each FDF-MAC may be coupled with a Lossless Ethernet bridging element 136. FDF 130 supports the instantiation of VA_Ports or VF_Ports over its FDF-MAC(s) 134. The FCDF Switching Element 139 may be coupled with a Fibre Channel Fabric interface 137, providing native A_Port and F_Port connectivity. Virtual and non-Virtual ports communicate through the FCDF Switching Element 139.

FDF 130 does not support VE_Ports. Also, VA_Ports and VF_Ports may not coexist over the same FDF MAC 134. An FDF-MAC 134 supporting the instantiation of VA_Ports is referred to as a "VA_Port capable FDF-MAC". An FDF-MAC 134 supporting the instantiation of VF_Ports is referred to as a "VF_Port capable FDF-MAC". A VF_Port capable FDF-MAC behaves as a VF_Port capable FCF-MAC. FDF 130 supports at least one VA_Port capable FDF-MAC.

The FCoE Controller 135 is the functional entity that performs the FCoE Initialization Protocol (FIP) and instantiates or de-instantiates VA_Ports or VF_Ports, as needed. FCoE Controller 135 may be implemented similarly to FCoE Controller 125, explained previously.

In an embodiment, the FCoE Controller 135 in a VA_Port capable FDF-MAC, a) optionally performs the FIP VLAN discovery protocol to discover FCoE VLANs;

b) discovers other VA_Port capable FDF-MACs and VA_Port/VE_Port capable FCF-MACs connected to the same Lossless Ethernet network using the FIP discovery protocol;

c) instantiates a VA_Port/FCoE_LEP pair on successful completion of each FIP ELP Exchange with a remote VA_Port capable FDF-MAC or VA_Port/VE_Port capable FCF-MAC;

d) de-instantiates a VA_Port/FCoE_LEP pair on receiving a FIP Clear Virtual Link request;

e) monitors the status of the instantiated VA_Port/FCoE_LEP pairs;

f) initiates FIP Clear Virtual Link requests as needed to terminate Virtual Links to other VA_Ports;

g) periodically transmits FIP Discovery Advertisements to the All-FCF-MACs address; and h) monitors the status of remote VA_Ports by maintaining timers and verifying that periodic FIP Discovery Advertisements are received within a predetermined period of time.

The FCoE_LEP 128 in FDF 130 operates in the same fashion as FCoE_LEP 128 in Controlling FCF 120.

FIP Discovery

Controlling FCFs 120 and FDFs 130 behave as FCFs from a point of view of FIP discovery, therefore they may discover each other through the FIP discovery protocol. Two additional flags are specified in the encapsulated FIP operation to indicate if the originator of a FIP frame is a Controlling FCF 120 or an FDF 130. More specifically, as shown in FIG. 6, Bit 5 of word one of the encapsulated FIP operation is the Controlling FCF flag. This bit set to one indicates that the originator of the FIP frame is a VA_Port/ VE_Port capable FCF-MAC. This bit set to zero indicates that the originator of the FIP frame is not a VA_Port/ VE_Port capable FCF-MAC.

Bit 4 of word one of the encapsulated FIP operation is the FDF flag. This bit set to one indicates that the originator of the FIP frame is a VA_Port capable FDF-MAC. This bit set to zero indicates that the originator of the FIP frame is not a VA_Port capable FDF-MAC.

The foregoing enhancement to the FIP discovery mechanism enables the several entities in a Distributed FCF 100, 200 to accurately identify themselves to each other, such that the Controlling FCF 120, for example, can keep track of, e.g., the overall mapping, i.e., MAC addresses, of Hosts and FDFs among other entities within the Distributed FCF 100 or 200 and entities connected thereto, and thus route paths between these respective entities or components.

Distributed FCF Operations

In a Distributed FCF 200 like that shown in FIG. 2, the (primary) Controlling FCF 120(1) defines the routes for the FDF topology and performs N_Port_ID allocations and deallocations for all its controlled FDFs 130 and connected Hosts 160. The primary Controlling FCF 120(1) also keeps its state synchronized with the secondary Controlling FCF 120(2).

When becoming operational, a Controlling FCF 120 performs FIP discovery to identify other entities to which it can communicate including FDFs 130 and other FCFs. Then, Controlling FCF 120 instantiates VA_Port to VA_Port Virtual Links with discovered FDFs 130 that are directly reachable and are part of its FDF set by initiating FIP ELP Exchanges. At this point the instantiated VA_Port to VA_Port Virtual Link becomes part of the Distributed FCF 200 internal topology (i.e., the set of VA_Port to VA_Port Virtual Links internal to the Distributed FCF 100). De-instantiation of the instantiated links may also be performed by the Controlling FCF 120(1).

When becoming operational, an FDF 130 also participates in FIP discovery. It then waits for a Controlling FCF 120 or another FDF 130 to initiate a FIP ELP Exchange with it, in order to set up a VA_Port to VA_Port Virtual Link. Upon instantiating the Virtual Link, an FDF 130 receives proper forwarding information from the primary Controlling FCF through the VA_Port protocols and becomes able to set up proper forwarding tables to forward FCoE frames inside and outside the Distributed FCF 100, 200. At this point the FDF 130 enables its VF_Port capable FCF-MACs for FIP discovery and FIP logins from ENodes (FCoE Nodes).

Once a distributed FCF 100 or 200 (FIGS. 1 and 2) is operational, data can be seamlessly passed from, e.g., a given Host 160 (such as a storage device or any other peripheral that is configured to communicate via the FCoE protocol) to any other Host 160, other FCF 140 or FC fabric 150. Taking Host 1, 160(1) in FIG. 1 as an example, a VN_Port to VF_Port virtual link is established between itself and FDF A 130(1). In this way FC frames can be sent via Ethernet (FCoE) toward what the Host 160(1) believes to be a FC fabric. However, in fact, the Host 160(1) is communicating with FDF 130(1), which may be far from FC fabric 150. The sent FCoE frame is received by FDF 130(1) and either passed to Controlling FCF 120 via the Lossless Ethernet network 170, or sent to another FDF 130 (again via the Lossless Ethernet network 170) for transmission to an entity (e.g., another Host 160) connected to that another FDF. FDF 130(1) forwards received FCoE frames destined to itself (i.e., having its FDF-MAC address as destination address) based on the D_ID of the Fibre Channel frame encapsulated in the received FCoE frame. In sum, and stated alternatively, Controlling FCF 200 can be considered to centralize control plane functions including, e.g., route computations, and access control computations on behalf of the several FDFs 130. Likewise, the several FDFs perform data plane functions including forwarding FCoE frames based on instructions received from Controlling FCF 200.

From the foregoing, those having skill in the art will appreciate that, among other advantages, the Distributed FCFs 100, 200 described herein enable the sharing of a single Domain_ID across multiple FC switching elements. That is, from, e.g., a given Host's perspective, the Distributed FCF is being accessed via a single Domain_ID, and that Host has no knowledge that, in fact, the Domain_ID being used is a virtual Domain_ID that logically aggregates all of the elements within the Distributed FCF 100 or 200. This feature can reduce the cost of an overall FCoE solution and simplify its management.

Distributed FC Switch Topologies

Figure 7:
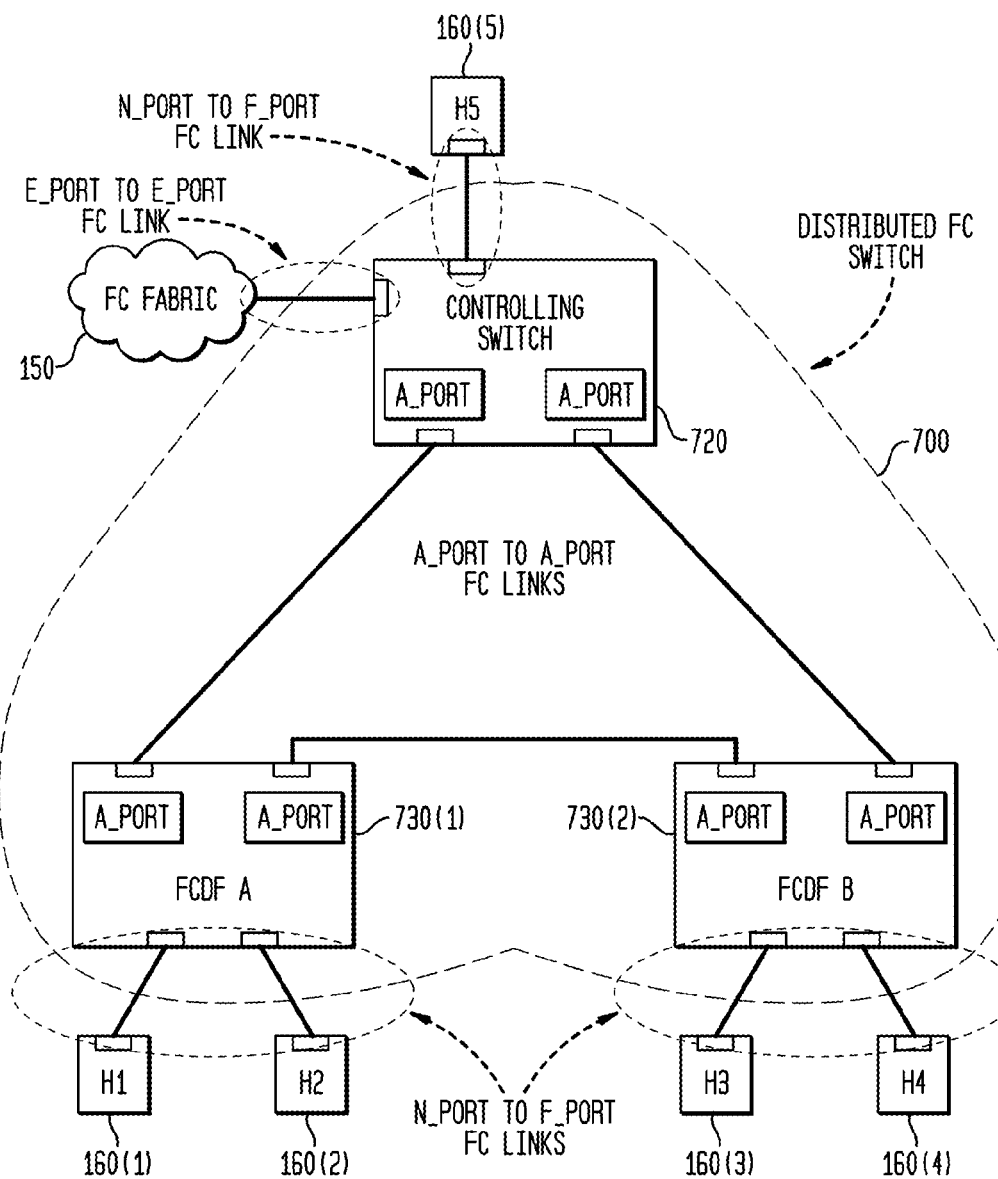
FIG. 7 shows a Distributed FC Switch including a Controlling Switch and associated FC Data-Plane Forwarder (FCDF) devices.

The approach of assigning a single (virtual) Domain_ID to multiple entities in the FCoE environment, can also be extended to native FC topologies as well. Reference is now made to FIG. 7, which is similar to FIG. 1. However, in FIG. 7 a Distributed FC Switch 700 is deployed that includes a Controlling Switch 720, which controls a set of FC Data-Plane Forwarders (FCDFs) 730 (i.e., simplified FC switching entities); FCoE is not employed in the implementation of FIG. 7.

From an external point of view (i.e., outside the dashed line designated by reference numeral 700), a Distributed FC Switch behaves as a Fibre Channel Switch. In particular, a Distributed Switch 700 supports the instantiation of N_Port to F_Port links and of E_Port to E_Port links. N_Port to F_Port links are supported by both FCDFs and Controlling Switch 720, while E_Port to E_Port links are supported, in an embodiment, only by Controlling Switch 720. This means that, in such an embodiment, it is possible to connect a Distributed FC Switch 700 to another Switch only through a Controlling Switch 720, not through an FCDF 730 (in this way the FCDF is simpler than the Controlling Switch 720).

From an internal point of view (i.e., inside the dashed line designated by reference numeral 700), A_Port to A_Port links enable FC frames forwarding between Controlling Switch 720 and FCDFs 730, as well as between FCDFs 730. In addition, A_Port to A_Port links may be used to exchange control information between Controlling Switch 720 and FCDFs 730.

Figure 8:
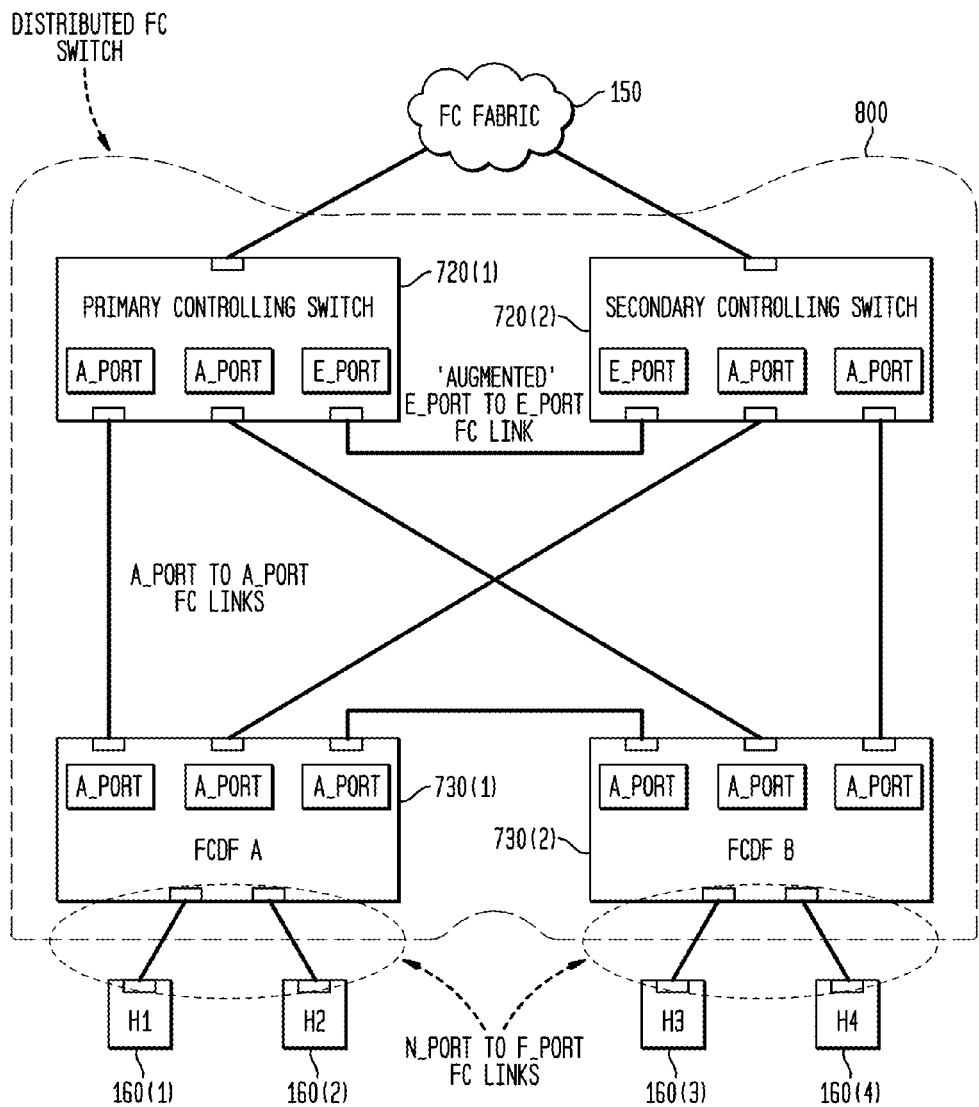
FIG. 8 depicts an embodiment of a Distributed FC Switch including a redundant pair of Controlling Switches.

FCDFs 730, in an embodiment, are not able to operate without a Controlling Switch 720. As such, a Distributed Switch configuration with only one Controlling Switch 720, as the one shown in FIG. 7, ceases its operations when the Controlling Switch 720 becomes unavailable. To avoid this issue, Distributed Switches may support a redundant configuration of two Controlling Switches, a primary one 720(1) and a secondary one 720(2), as shown in FIG. 8. The primary Controlling Switch 720(1) may perform all Controlling Switch functions, whereas the secondary Controlling Switch 720(2) keeps its state synchronized with the primary one and is able to take the place of the primary one in case of its failure.

The two Controlling Switches 720(1), 720(2) in a redundant Distributed Switch 800 instantiate at least one 'augmented' E_Port to E_Port link between themselves, where the term 'augmented' indicates that link is used also for a redundancy protocol, in addition to normal E_Port operation. More than one 'augmented' E_Port to E_Port link may be implemented to improve the redundancy of the system. These 'augmented' E_Port to E_Port links are used by the primary Controlling Switch 720(1) to inform the secondary Controlling Switch 720(2) of the Virtual Domain_ID from which to perform N_Port_ID allocations for Nodes connected to the set of FCDFs 730 belonging to the Distributed Switch 800. Using a Virtual Domain_ID to assign N_Port_IDs enables seamless operation in case of failures of one of the two redundant Controlling Switches 720(1), 720(2). As a result, a redundant Distributed Switch 800 in accordance with an embodiment typically employs three Domain_IDs: one for each Controlling Switch and one for the Virtual Domain_ID.

The two redundant Controlling Switches 720(1), 720(2) instantiate A_Port to A_Port links to enable FC frames forwarding and the communication of control information between them and the FCDFs 730. In a redundant configuration, FCDFs 730 instantiate A_Port to A_Port links to each of the Controlling Switches 720(1), 720(2) and between themselves.

Figure 9:
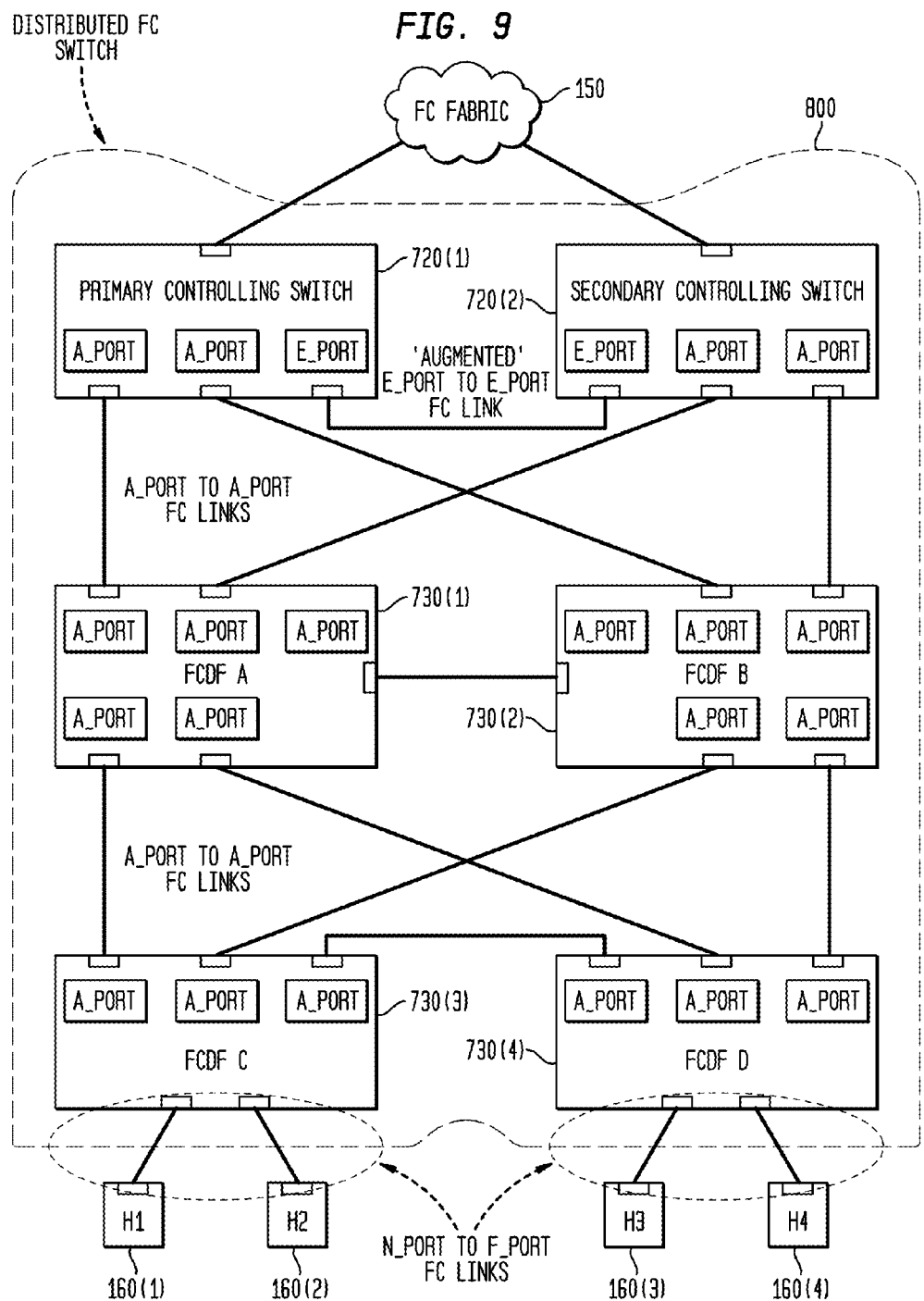
FIG. 9 depicts an example of a Distributed FC Switch with cascaded FCDF devices.

A Distributed Switch 800, like Distributed FCF 200, may also have a cascaded FCDF configuration, as shown in FIG. 9. However, rather than FIP discovery that is used in connection with FCoE to discover FCoE-capable MACs, discovery of the several entities in a Distributed FC Switch may be performed using ELP Exchanges.

FC Controlling Switch

Figure 10:
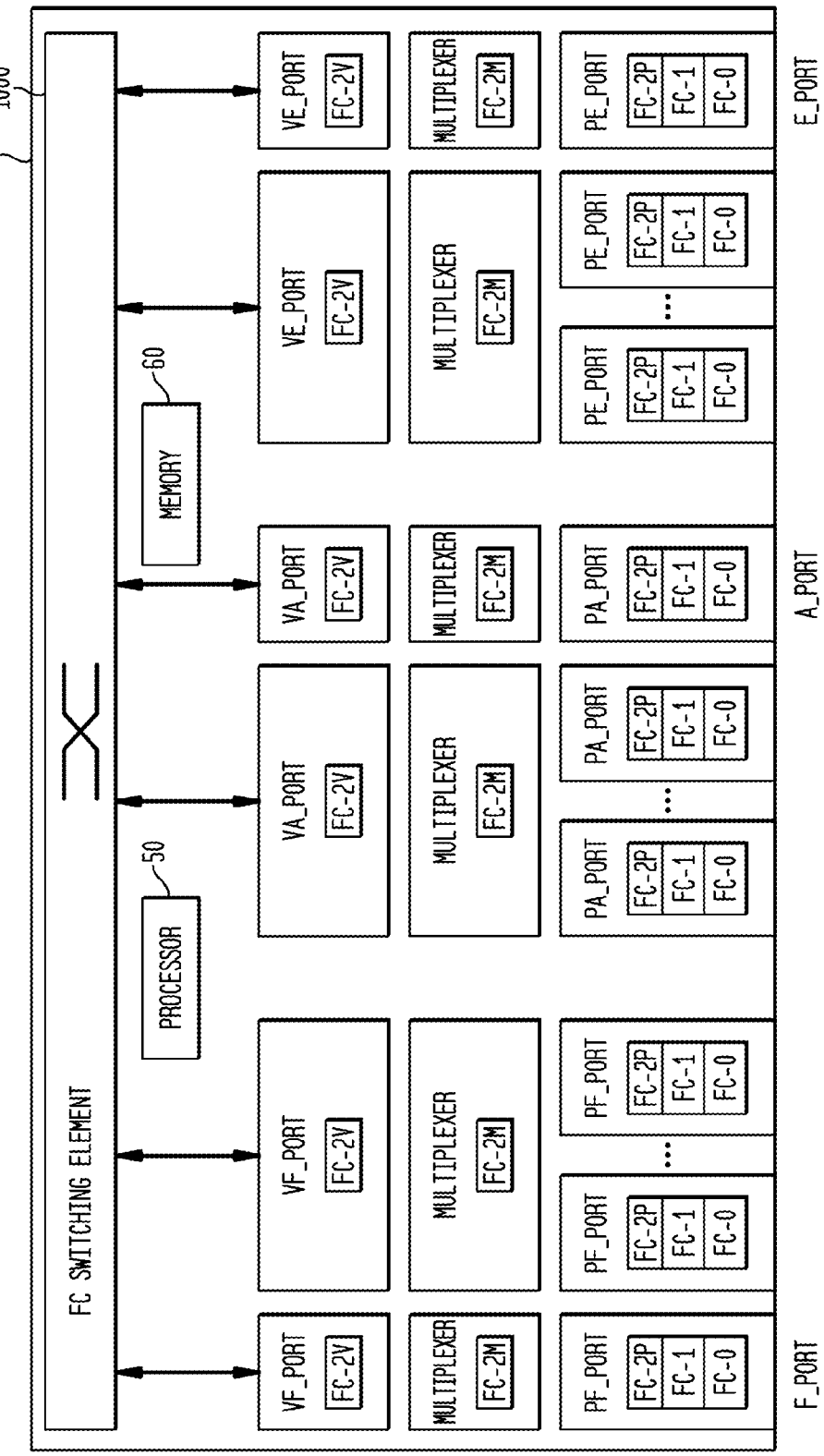
FIG. 10 is an example functional block diagram of a Controlling FC Switch.

FIG. 10 shows a functional block diagram of a Controlling Switch 720. Controlling Switch 720 is an FC Switch that supports the instantiation of VA_Ports, in addition to VF_Ports and VE_Ports. In one possible implementation, Controlling Switch 720 is able to aggregate its physical ports in sets that behave as virtual ports, providing higher bandwidth than the one available to a single physical port.

For a Controlling Switch, a physical port is an LCF (Link Control Facility) that may behave as a Physical F_Port (PF_Port), as a Physical E_Port (PE_Port), or as a Physical A_Port (PA_Port). A virtual port is an instance of the FC-2V sublevel of Fibre Channel, which may behave as a Virtual F_Port (VF_Port), as a Virtual E_Port (VE_Port), or as a Virtual A_Port (VA_Port). These ports are accessible via FC Switching Element 1000. The foregoing port types are depicted in FIG. 10. FC Controlling Switch 720 may be implemented with processor 50 and memory 60 as explained previously.

FCDF

Figure 11:
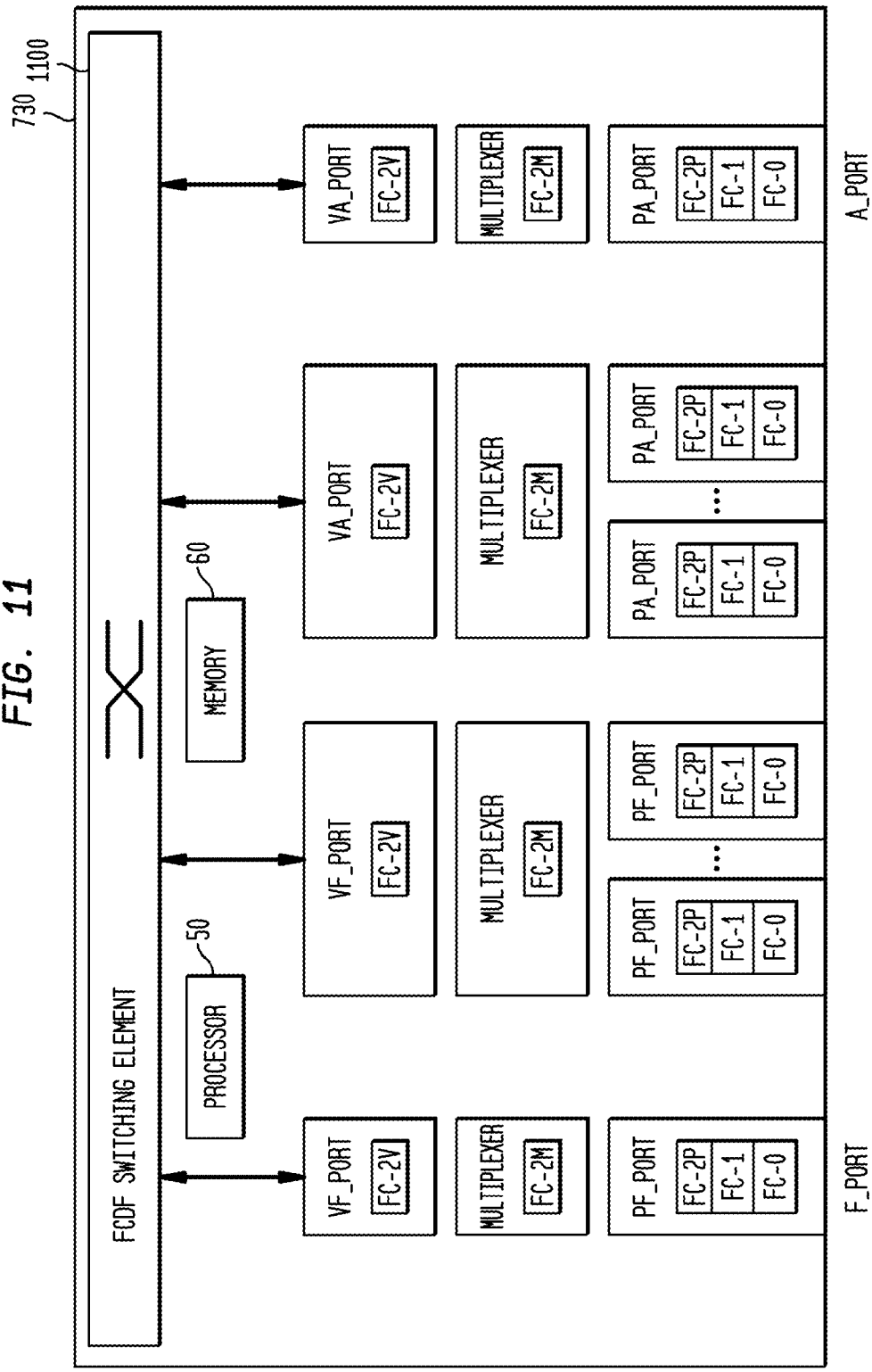
FIG. 11 is an example functional block diagram of an FCDF device.

FIG. 11 shows a functional block diagram of an FCDF 730. An FCDF comprises a set of physical ports interconnected by an FCDF Switching Element 1100. For an FCDF, a physical port is an LCF that may behave as a Physical F_Port (PF_Port) or as a Physical A_Port (PA_Port). A virtual port is an instance of the FC-2V sublevel of Fibre Channel that may behave as a Virtual F_Port (VF_Port) or as a Virtual A_Port (VA_Port). An FCDF may not include E_Ports, PE_Ports, nor VE_Ports.

Figure 12:
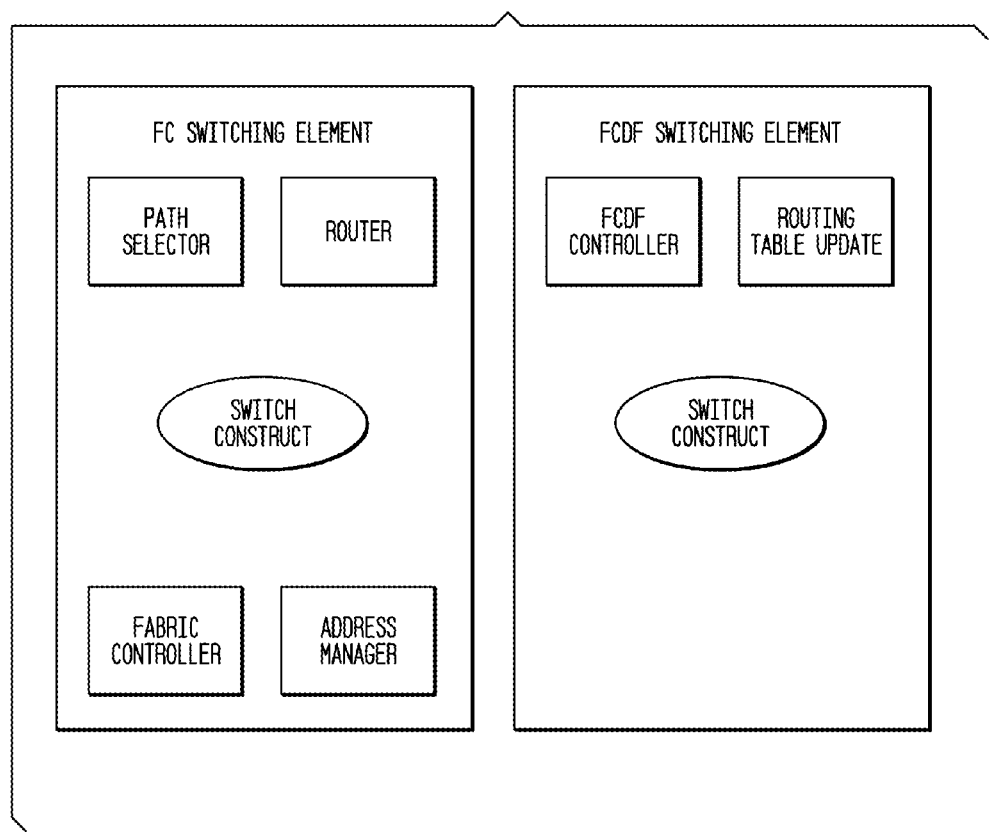
FIG. 12 depicts components of a FC switching element and a FCDF switching element.

The switching functionality of an FCDF is defined by an FCDF Switching Element, which is simpler than the FC Switching Element defining the behavior of a FC Switch or of a Controlling Switch, as shown in FIG. 12.

As defined by the FC-SW-5 standard, an FC Switching Element comprises five functions: a Switch Construct, a Router, a Path Selector, an Address Manager, and a Fabric Controller. The Switch Construct is the entity performing FC frames forwarding based on the FC frame's D_ID field according to a routing table. The Router is a logical entity that updates the Switch Construct's routing table according to the path selections performed by the Path Selector function. The Address Manager is a logical entity performing address allocation for the Nodes that connect to the Switch and the Fabric Controller is a logical entity that performs the management of the Switch through the traditional Fibre Channel switching protocols.

An FCDF Switching Element comprises three functions: a Switch Construct, a Routing Table Update and a FCDF Controller. As for the FC Switching Element, the Switch Construct is the entity performing FC frames forwarding based on the FC frame's D_ID field according to a routing table. The Routing Table Update is a logical entity that updates the Switch Construct's routing table through the VA_Port protocols. The FCDF Controller is a logical entity that performs the management of the FCDF through the VA_Port protocols.

Referring again to FIGS. 7-9, an A_Port is the point at which a Controlling Switch 720 is connected to an FCDF 730 to create a Distributed Switch 700, 800. Also, an A_Port is the point at which an FCDF 730 is connected to another FCDF 730. It normally functions as a conduit among FCDFs 730 and between FCDFs 730 and Controlling Switches 720 for frames destined for remote N_Ports. An A_Port may also be used to carry frames between Controlling Switch 720 and FCDFs 730 for purposes of configuring and maintaining the Distributed Switch 700, 800 through the VA_Port protocols.

An A_Port to A_Port link becomes operational on successful completion of an ELP Exchange between a Controlling Switch 720 and a FCDF 730 or between two FCDFs 730. In one embodiment, two additional flags are specified in an ELP payload to indicate if the originator of the ELP Request is a Controlling Switch 720 or an FCDF 730. Specifically, in one embodiment, Bit 13 of the flags field of an ELP payload is the Controlling Switch flag. This bit set to one indicates that the originator of the ELP Request is a Controlling Switch 720. This bit set to zero indicates that the originator of the ELP Request is not a Controlling Switch. Bit 12 of the flags field of the ELP payload is the FCDF flag. This bit set to one indicates that the originator of the ELP Request is an FCDF 730. This bit set to zero indicates that the originator of the ELP Request is not an FCDF 730. With this flagging mechanism, as the links are instantiated, the associated ports can be designated as E_Ports, 'augmented' E_Ports, or A_Ports depending on the indicated flag received from an entity responding to the ELP Request.

Once the links are established and a topology like that shown in any one of FIGS. 7-9 is defined, and proper forwarding information is received through the VA_Port protocols from the primary Controlling Switch, FC frame forwarding through the Distributed Switch 700, 800 can proceed. From the perspective of, e.g., a given Host 160, which has instantiated an N_Port to F_Port FC Link with an FCDF 730, FC frames are simply transmitted according to the FC protocol towards, with what the Host believes is a FC fabric (F_Port), when in fact the FC frame is being transmitted to a FCDF 730 within the Distributed FC Switch 700, 800. An FCDF forwards a received FC frame based on its D_ID.

VA_Port Protocols

The VA_Port protocols enable proper operations of a Distributed FCF or of a Distributed FC Switch once VA_Port to VA_Port Virtual Links are established in a Distributed FCF or A_Port to A_Port links are established in a Distributed FC Switch. The VA_Port protocols behave in the same way for both Distributed FC Switch (i.e., native FC) and Distributed FCF (i.e., FCoE). The VA_Port protocols are based on the set of messages shown in Table 1.

TABLE 1

| Description | Abbreviation |
| --- | --- |
| VN_Port Reachability Notification | VNRN |
| VN_Port Unreachability Notification | VNUN |
| FDF/FCDF Reachability Notification | FDRN |
| FDF/FCDF Unreachability Notification | FDUN |
| N_Port_ID Route Distribution | NPRD |
| N_Port_ID and Zoning ACL Distribution | NPZD |
| Active Zoning ACL Distribution | AZAD |
| Distributed FCF/Switch Membership Distribution | DFMD |

On establishing a connection with an FCDF or FDF (i.e., on instantiating an A_Port to A_Port link or a VA_Port to VA_Port Virtual Link), the primary Controlling Switch or FCF sends a DFMD message to that FCDF or FDF to indicate it is now part of the Distributed Switch or FCF. At this point that FCDF or FDF becomes operational. The primary Controlling Switch or FCF recomputes the N_Port_ID routing information including also that FCDF or FDF and distributes the updated routing information to all the FCDFs or FDFs part of the distributed Switch or FCF through NPRD messages. In a similar way, when a connection with an FCDF or FDF is removed (i.e., on de-instantiating an A_Port to A_Port link or a VA_Port to VA_Port Virtual Link), the primary Controlling Switch or FCF recomputes the N_Port_ID routing information without that FCDF or FDF and distributes the updated routing information to all the FCDFs or FDFs part of the distributed Switch or FCF through NPRD messages. While these message exchanges are performed, the primary Controlling Switch or FCF also takes care of keeping synchronized its state with the secondary Controlling Switch or FCF through the 'augmented' E_Port to E_Port links or VE_Port to VE_Port Virtual Links.

On establishing a connection with another FCDF or FDF (i.e., on instantiating an A_Port to A_Port link or a VA_Port to VA_Port Virtual Link), an FCDF or FDF sends a FDRN message to the primary controlling Switch or FCF to indicate the reachability of that FCDF/FDF. The primary Controlling Switch or FCF sends a DFMD message to that FDF to indicate it is now part of the Distributed Switch or FCF. At this point that FCDF or FDF becomes operational. The primary Controlling Switch or FCF recomputes the N_Port_ID routing information including also that FCDF or FDF and distributes the updated routing information to all the FCDFs or FDFs part of the distributed Switch or FCF through NPRD messages. In a similar way, when a connection with another FCDF or FDF is removed (i.e., on de-instantiating an A_Port to A_Port link or a VA_Port to VA_Port Virtual Link), an FCDF or FDF sends a FDUN message to the primary Controlling Switch or FCF to indicate such an event. The primary Controlling Switch or FCF recomputes the N_Port_ID routing information without that FCDF or FDF and distributes the updated routing information to all the FCDFs or FDFs part of the distributed Switch or FCF through NPRD messages. While these message exchanges are performed, the primary Controlling Switch or FCF also takes care of keeping synchronized its state with the secondary Controlling Switch or FCF through the 'augmented' E_Port to E_Port links or VE_Port to VE_Port Virtual Links.

On receiving a Fabric Login or NPIV FDISC (N_Port_ID Virtualization Fabric Discovery) request from an N_Port or VN_Port, an FCDF or FDF sends a VNRN message to the primary controlling Switch or FCF to indicate the reachability of that N_Port/VN_Port. If the primary Controlling Switch/FCF accepts that request, it allocates a N_Port_ID for that N_Port from the Virtual Domain_ID, updates the Fabric name server accordingly, computes proper zoning enforcement information (i.e., access control) and distributes the allocated N_Port_ID and Zoning information to all FCDFs/FDFs through NPZD messages. The NPZD message provides both addressing and zoning information, therefore its reception enables the FCDF/FDF to enforce proper access control and to reply to the N_Port or VN_Port request. In a similar way, when an N_Port or VN_Port becomes unreachable, an FCDF or FDF send a VNUN message to the primary Controlling Switch or FCF to indicate such an event. The primary Controlling Switch or FCF de-registers the information associated with the unreachable node from the FC fabric and updates all FCDF or FDF part of the Distributed Switch or FCF through NPZD messages. While these message exchanges are performed, the primary Controlling Switch or FCF also takes care of keeping synchronized its state with the secondary Controlling Switch or FCF through the 'augmented' E_Port to E_Port links or VE_Port to VE_Port Virtual Links.

When the Fabric Zoning configuration changes, the primary Controlling Switch or FCF updates the Zoning information of all FCDFs or FDFs part of the Distributed Switch or FCF through AZAD messages.

Example Distributed FCF Operations

Figure 13:
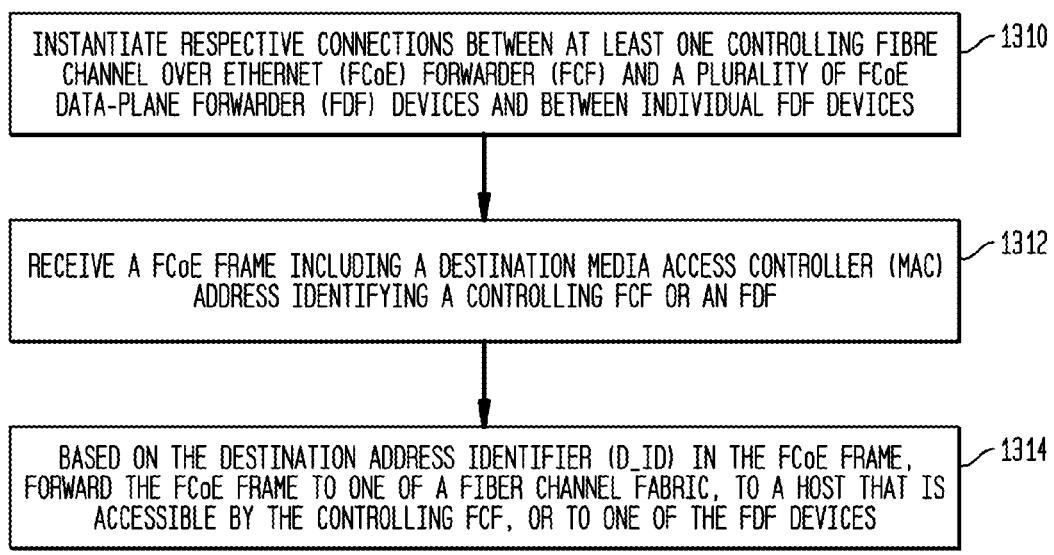
FIGS. 13-15 depict example operations of a Distributed FCF.
Figure 14:
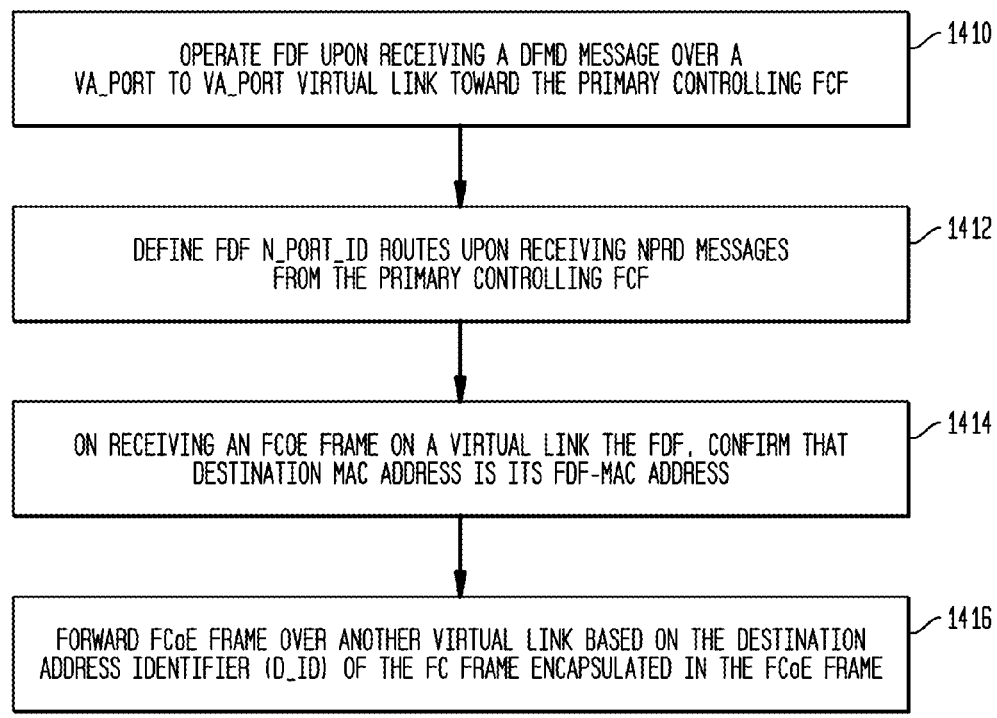
Figure 15:
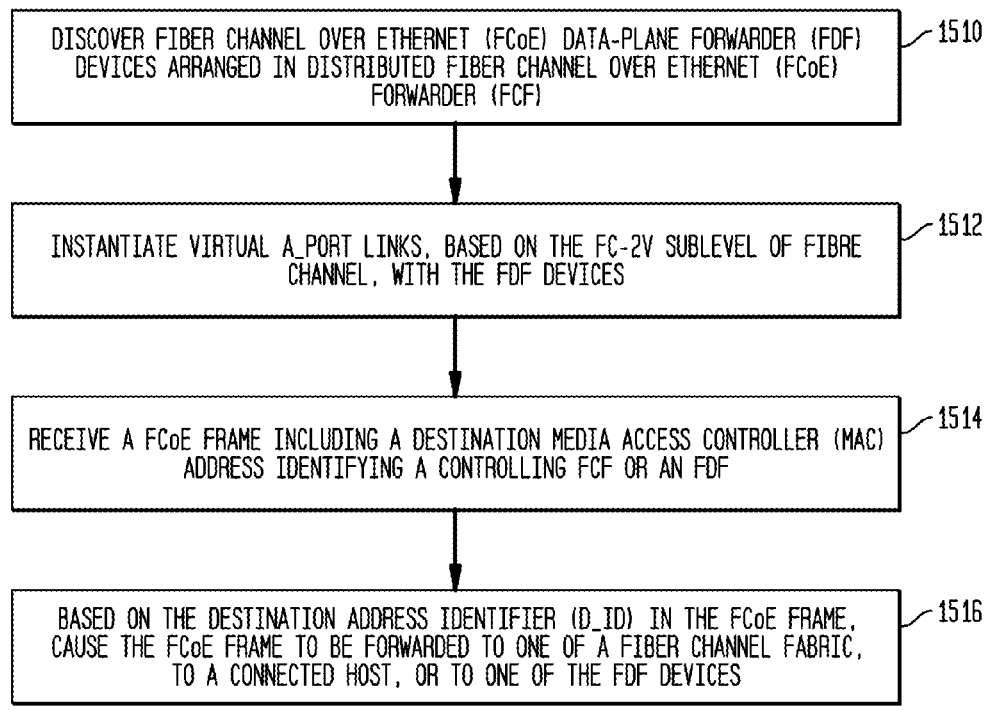

Reference is now made to FIGS. 13-15, which depict example operations of a Distributed FCF or portions thereof.

FIG. 13 shows operations in connection with establishing a distributed Fiber Channel over Ethernet (FCoE) Forwarder (FCF). At 1310 respective connections are instantiated between at least one Controlling FCF and a plurality of FCoE Data-Plane Forwarder (FDF) devices and between individual FDF devices. One established, at 1312, the operations include receiving a FCoE frame addressed to a Controlling FCF or an FDF of the distributed FCF, and then, at 1314, based on the destination address identifier (D_ID) in the FCoE frame, forwarding the FCoE frame to one of a Fiber Channel fabric, to a host that is accessible by the Controlling FCF, or to one of the FDF devices.

FIG. 14 depicts example operations of an FDF. The FDF becomes operational at 1410 upon receiving a DFMD message over a VA_Port to VA_Port Virtual Link toward the primary Controlling FCF. At 1412, the FDF N_Port_ID routes are defined upon receiving NPRD messages from the primary Controlling FCF. On receiving an FCoE frame on a Virtual Link, the FDF, at 1414, confirms that the destination MAC address is its FDF-MAC address. At 1416, the FCoE frame is forwarded over another Virtual Link based on the destination address identifier (D_ID) of the FC frame encapsulated in the FCoE frame.

FIG. 15 depicts other operational aspects of a Distributed FCF. At 1510, the operation includes discovering Fiber Channel over Ethernet (FCoE) Data-Plane Forwarder (FDF) devices arranged in distributed Fiber Channel over Ethernet (FCoE) Forwarder (FCF) and then, at 1512, instantiating virtual A_Port links, based on the FC-2V sublevel of Fibre Channel, with the FDF devices. Subsequently, at 1514, the operations include receiving a FCoE frame including a destination Media Access Controller (MAC) address identifying a Controlling FCF or an FDF of the distributed FCF, and then, at 1516, based on the destination address identifier (D_ID) in the FCoE frame, causing the FCoE frame to be forwarded to one of a Fiber Channel fabric, to a connected host, or to one of the FDF devices.

Example Distributed Switch Operations

Figure 16:
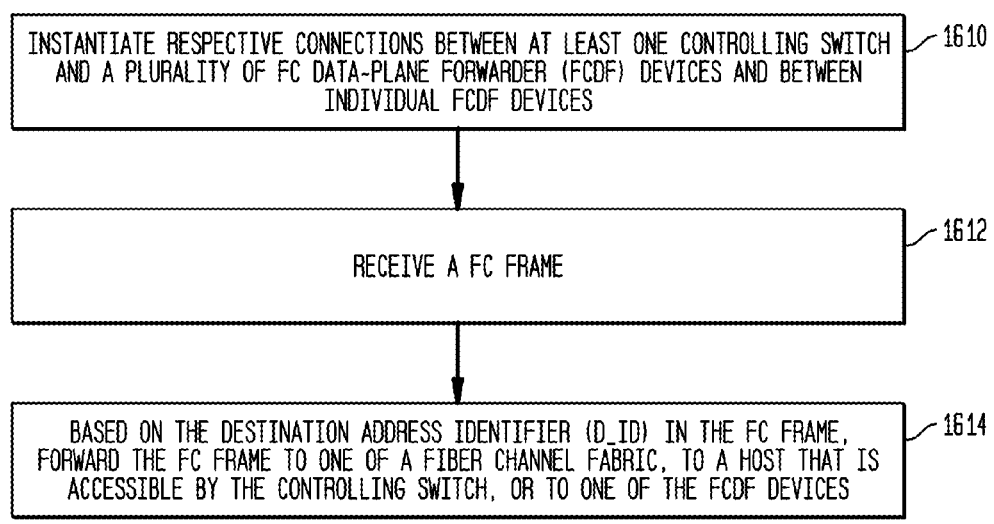
FIGS. 16-18 depict example operations of a Distributed FC Switch.
Figure 17:
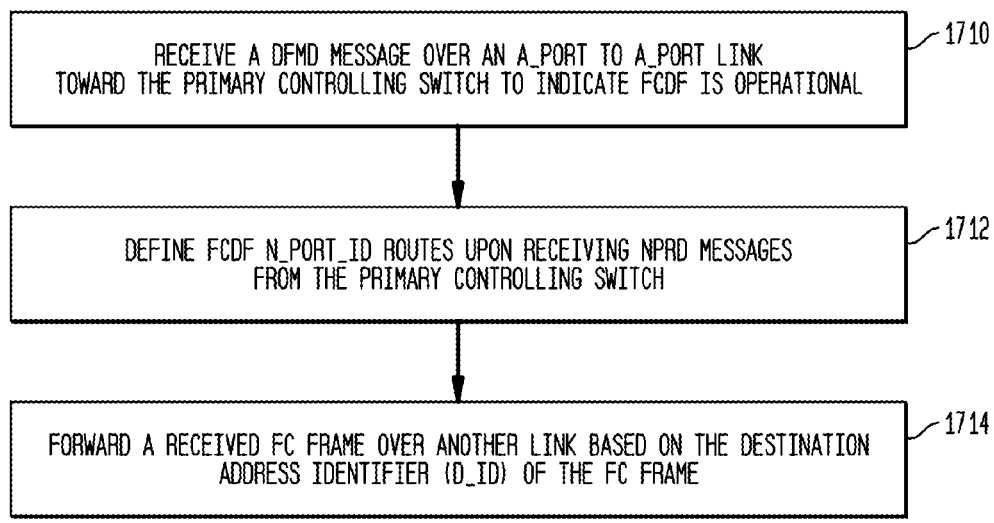
Figure 18:
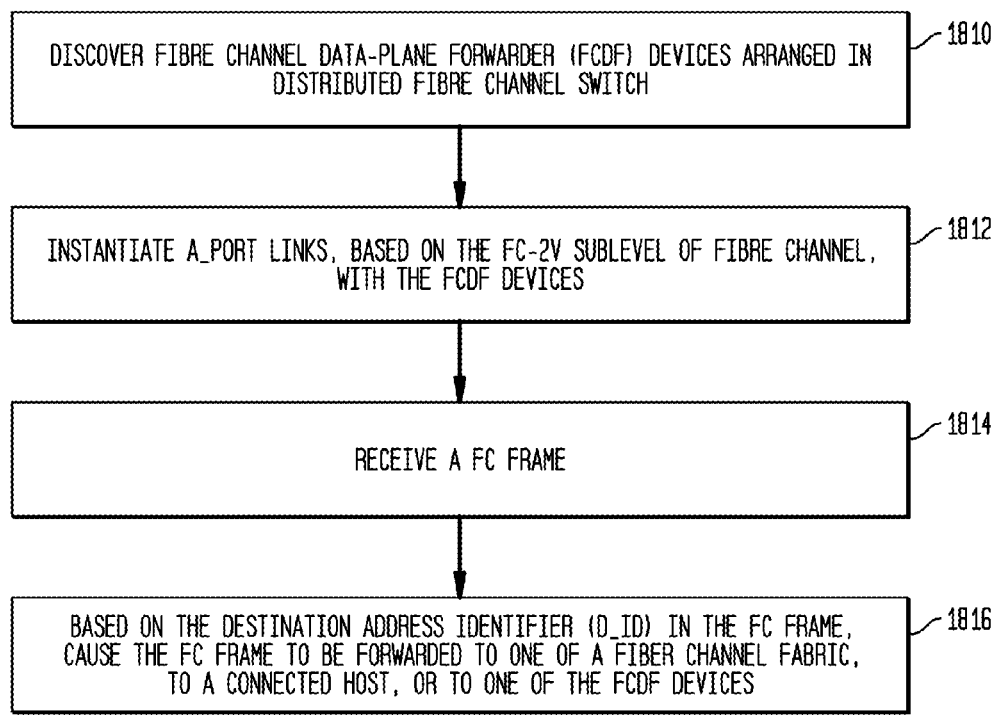

Reference is now made to FIGS. 16-18, which depict example operations of a Distributed Switch or portions thereof.

FIG. 16 shows operations in connection with establishing a distributed Fiber Channel Switch. At 1610 respective connections are instantiated between at least one Controlling Switch and a plurality of FC Data-Plane Forwarder (FCDF) devices and between individual FCDF devices. One established, at 1612, the operations include receiving a FC frame, and then, at 1614, based on the destination address identifier (D_ID) in the FC frame, forwarding the FC frame to one of a Fiber Channel fabric, to a host that is accessible by the Controlling Switch, or to one of the FCDF devices.

FIG. 17 depicts example operations of an FCDF. The FCDF becomes operational at 1710 upon receiving a DFMD message over an A_Port to A_Port link toward the primary Controlling Switch. At 1712, the FCDF N_Port_ID routes are defined upon receiving NPRD messages from the primary Controlling Switch. At 1716, a received FC frame is forwarded over another link based on the destination address identifier (D_ID) of the FC frame.

FIG. 18 depicts other operational aspects of a Distributed Switch. At 1810, an operation includes discovering Fiber Channel Data-Plane Forwarder (FCDF) devices arranged in distributed Fiber Channel Switch and then, at 1812, instantiating A_Port links, based on the FC-2V sublevel of Fibre Channel, with the FCDF devices. Subsequently, at 1514, the operations include receiving a FC frame, and then, at 1516, based on the destination address identifier (D_ID) in the FC frame, causing the FC frame to be forwarded to one of a Fiber Channel fabric, to a connected host, or to one of the FCDF devices.

In sum, the Controlling Switch centralizes control plane functions including, e.g., route computations and access control computations on behalf of the several FCDFs. And, the several FCDFs perform data plane functions including, e.g., forwarding FC frames based on instructions received from the Controlling Switch.

Although the system and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. An apparatus, comprising:
   a Controlling Fibre Channel Switch; and
   a plurality of Fibre Channel Data-Plane Forwarder (FCDF) devices in communication with the Controlling Fibre Channel Switch, wherein the plurality of FCDF devices are not able to operate without the Controlling Fibre Channel Switch,
   wherein the Controlling Fibre Channel Switch and the plurality of FCDF devices operate as a single distributed switch, are represented by a single domain identifier and communicate with one another without use of an Ethernet network,
   wherein the plurality of FCDF devices are in communication with the Controlling Fibre Channel Switch and with each other via respective A_Port to A_Port Fibre Channel links, and
   wherein the Controlling Fibre Channel Switch centralizes control plane functions, including route computations and access control computations, on behalf of the plurality of FCDFs, and communicates with the plurality of FCDF devices via an Adjacent Port (A_Port) protocol that includes a Distributed Fibre Channel Switch Membership Distribution (DFMD) message configured to establish that a given FCDF is part of the distributed switch.

2. The apparatus of claim 1, wherein the plurality of FCDF devices are configured to perform data plane functions including forwarding fibre channel (FC) frames based on instructions received from the Controlling Fibre Channel Switch.

3. The apparatus of claim 1, wherein the Controlling Fibre Channel Switch is configured to support N_Port to F_Port links and E_Port to E_Port links, and the plurality of FCDF devices are configured to support N_Port to F_Port links, but not any E_Port to E_Port links.

4. The apparatus of claim 1, wherein a given A_Port to A_Port Fibre Channel link becomes operational on successful completion of an exchange link parameters (ELP) exchange between the Controlling Fibre Channel Switch and a given one of the plurality of FCDF devices.

5. The apparatus of claim 4, wherein a payload of the ELP exchange includes an indication as to whether an originator of the ELP exchange is a Controlling Fibre Channel Switch or an FCDF device.

6. The apparatus of claim 1, wherein the Controlling Fibre Channel Switch is a primary Controlling Fibre Channel Switch, and further comprising a secondary Controlling Fibre Channel Switch in communication with the primary Controlling Fibre Channel Switch.

7. The apparatus of claim 6, wherein the primary and the secondary Controlling Fibre Channel Switches are configured to communicate with one another via an augmented E_Port to E_Port Fibre Channel link.

8. A method comprising:
   establishing a distributed fibre channel (FC) switch by instantiating respective connections between a Controlling Fibre Channel Switch and a plurality of Fibre Channel Data-Plane Forwarder (FCDF) devices in communication with the Controlling Fibre Channel Switch, wherein the plurality of FCDF devices are not able to operate without the Controlling Fibre Channel Switch, wherein the connections are established without use of an Ethernet network, and wherein the plurality of FCDF devices communicate with the Controlling Fibre Channel Switch and with each other via respective A_Port to A_Port Fibre Channel links;
   receiving a FC frame addressed to the Controlling Fibre Channel Switch or one of the plurality of FCDF devices of the distributed FC switch; and
   based on a destination address identifier (D_ID) in the FC frame, forwarding the FC frame to (i) a Fibre Channel fabric, (ii) a host that is accessible to the Controlling Fibre Channel Switch or (iii) one of the plurality of FCDF devices,
   wherein the Controlling Fibre Channel Switch centralizes control plane functions, including route computations and access control computations, on behalf of the plurality of FCDFs, and communicates with the FCDF devices via an Adjacent Port (A_Port) protocol that includes a Distributed Fibre Channel Switch Membership Distribution (DFMD) message configured to establish that a given FCDF is part of the distributed fibre channel switch.

9. The method of claim 8, wherein the plurality of FCDF devices perform data plane functions including forwarding FC frames based on instructions received from the Controlling Fibre Channel Switch.

10. The method of claim 8, wherein the Controlling Fibre Channel Switch supports N_Port to F_Port links and E_Port to E_Port links, and the plurality of FCDF devices support N_Port to F_Port links, but not any E_Port to E_Port links.

11. The method of claim 8, wherein a given A_Port to A_Port Fibre Channel link becomes operational on successful completion of an Exchange Link Parameters (ELP) exchange between the Controlling Fibre Channel Switch and a given one of the plurality of FCDF devices.

12. The method of claim 11, wherein a payload of the ELP exchange includes an indication as to whether an originator of the ELP exchange is a Controlling Fibre Channel Switch or an FCDF device.

13. The method of claim 8, wherein the Controlling Fibre Channel Switch is a primary Controlling Fibre Channel Switch, the method further comprising instantiating a secondary Controlling Fibre Channel Switch in communication with the primary Controlling Fibre Channel Switch.

14. The method of claim 13, wherein the primary and the secondary Controlling Fibre Channel Switches are configured to communicate with one another via an augmented E_Port to E_Port Fibre Channel link.

15. The method of claim 8, further comprising assigning a single domain identifier to the Controlling Fibre Channel Switch and the plurality of FCDF devices.

\* \* \* \* \*